United States Patent
Chen et al.

(10) Patent No.: US 8,332,925 B2
(45) Date of Patent: Dec. 11, 2012

(54) SYSTEM AND METHOD FOR DISTRIBUTED MULTI-PROCESSING SECURITY GATEWAY

(75) Inventors: Lee Chen, Saratoga, CA (US); Ronald Wai Lun Szeto, Pleasanton, CA (US)

(73) Assignee: A10 Networks, Inc., San Jose, CA (US)

(*) Notice: Subject to any disclaimer, the term of this patent is extended or adjusted under 35 U.S.C. 154(b) by 1401 days.

(21) Appl. No.: 11/501,607

(22) Filed: Aug. 8, 2006

(65) Prior Publication Data

US 2008/0040789 A1    Feb. 14, 2008

(51) Int. Cl.
   *G06F 21/00*    (2006.01)
(52) U.S. Cl. .............. 726/12; 726/11; 726/22; 713/153; 380/264; 455/453; 705/79; 709/227
(58) Field of Classification Search ............ 726/11, 726/12
   See application file for complete search history.

(56) References Cited

U.S. PATENT DOCUMENTS

| | | | |
|---|---|---|---|
| 6,360,265 B1* | 3/2002 | Falck et al. | 709/227 |
| 6,389,462 B1* | 5/2002 | Cohen et al. | 709/218 |
| 6,832,322 B1* | 12/2004 | Boden et al. | 726/15 |
| 7,013,338 B1* | 3/2006 | Nag et al. | 709/226 |
| 7,086,086 B2* | 8/2006 | Ellis | 726/15 |
| 7,266,604 B1* | 9/2007 | Nathan et al. | 709/225 |
| 7,284,272 B2* | 10/2007 | Howard et al. | 726/22 |
| 7,290,050 B1* | 10/2007 | Smith et al. | 709/224 |
| 7,308,710 B2* | 12/2007 | Yarborough | 726/11 |
| 7,406,709 B2* | 7/2008 | Maher et al. | 726/12 |
| 7,441,270 B1* | 10/2008 | Edwards et al. | 726/15 |
| 7,451,312 B2* | 11/2008 | Medvinsky et al. | 713/168 |
| 7,516,485 B1* | 4/2009 | Lee et al. | 726/11 |
| 7,529,242 B1* | 5/2009 | Lyle | 370/392 |
| 7,583,668 B1* | 9/2009 | Mayes et al. | 370/389 |
| 7,591,001 B2* | 9/2009 | Shay | 726/1 |
| 7,603,454 B2* | 10/2009 | Piper | 709/223 |
| 2003/0088788 A1* | 5/2003 | Yang | 713/201 |
| 2004/0107360 A1* | 6/2004 | Herrmann et al. | 713/201 |
| 2004/0243718 A1* | 12/2004 | Fujiyoshi | 709/237 |
| 2005/0033985 A1* | 2/2005 | Xu et al. | 713/201 |
| 2005/0074001 A1* | 4/2005 | Mattes et al. | 370/389 |
| 2005/0251856 A1* | 11/2005 | Araujo et al. | 726/12 |
| 2006/0062142 A1* | 3/2006 | Appanna et al. | 370/219 |
| 2006/0064440 A1* | 3/2006 | Perry | 707/200 |
| 2006/0080446 A1* | 4/2006 | Bahl | 709/227 |
| 2006/0126625 A1* | 6/2006 | Schollmeier et al. | 370/390 |
| 2007/0002857 A1* | 1/2007 | Maher | 370/389 |

(Continued)

OTHER PUBLICATIONS

Chiussi et al., "A Network Architecture for MPLS-Based Micro-Mobility", IEEE WCNC 02, Orlando, Mar. 2002.*

(Continued)

*Primary Examiner* — Morshed Mehedi
(74) *Attorney, Agent, or Firm* — North Shore Patents, P.C.; Michele Liu Baillie

(57) ABSTRACT

A system and method for a distributed multi-processing security gateway establishes a host side session, selects a proxy network address for a server based on network information, and using the proxy network address to establish a server side session. The proxy network address is selected such that a same processing element is assigned to process data packets from the server side session and the host side session. The network information includes a security gateway network address and a host network address. By assigning processing elements in this manner, higher capable security gateways are provided.

15 Claims, 6 Drawing Sheets

U.S. PATENT DOCUMENTS

| | | | |
|---|---|---|---|
| 2007/0124487 A1* | 5/2007 | Yoshimoto et al. | 709/230 |
| 2007/0177506 A1* | 8/2007 | Singer et al. | 370/235 |
| 2007/0180226 A1* | 8/2007 | Schory et al. | 713/153 |
| 2007/0294694 A1* | 12/2007 | Jeter et al. | 718/102 |
| 2009/0049537 A1* | 2/2009 | Chen et al. | 726/12 |

OTHER PUBLICATIONS

International Search Report and Written Opinion of Corresponding PCT application No. PCT/US07/71716.

* cited by examiner

SYSTEM AND METHOD FOR DISTRIBUTED MULTI-PROCESSING SECURITY GATEWAY

FIELD

This invention relates generally to data networking, and more specifically, to a system and method for a distributed multi-processing security gateway.

RELATED ART

Data network activities increases as more and more computers are connected through data networks, and more and more applications utilize the data networks for their functions. Therefore, it becomes more important to protect the data network against security breaches.

There are currently many security gateways such as firewalls, VPN firewalls, parental control appliances, email virus detection gateways, special gateways for phishing and spyware, intrusion detection and prevention appliances, access control gateways, identity management gateways, and many other types of security gateways. These products are typical implemented using a general purpose micro-processor such as Intel Pentium, an AMD processor or a SPARC processor, or an embedded micro-processor based on RISC architecture such as MIPS architecture, PowerPC architecture, or ARM architecture.

Micro-processor architectures are limited in their processing capability. Typically they are capable of handling up to a gigabit per second of bandwidth. hi the past few years, data network bandwidth utilization increases at a pace faster than improvements of micro-processor capabilities. Today, it is not uncommon to see multi-gigabit per second of data network bandwidth utilization in many medium and large secure corporate data networks. It is expected such scenarios to become more prevailing in most data networks, including small business data network, residential networks, and service provider data networks.

The trend in the increasing usage of data networks illustrates a need for better and higher capable security gateways, particularly in using multiple processing elements, each being a micro-processor or based on micro-processing architecture, to work in tandem to protect the data networks.

SUMMARY

A system and method for a distributed multi-processing security gateway establishes a host side session, selects a proxy network address for a server based on network information, and using the proxy network address to establish a server side session. The proxy network address is selected such that a same processing element is assigned to process data packets from the server side session and the host side session. The network information includes a security gateway network address and a host network address. By assigning processing elements in this manner, higher capable security gateways are provided.

DETAILED DESCRIPTION

Figure 1A:
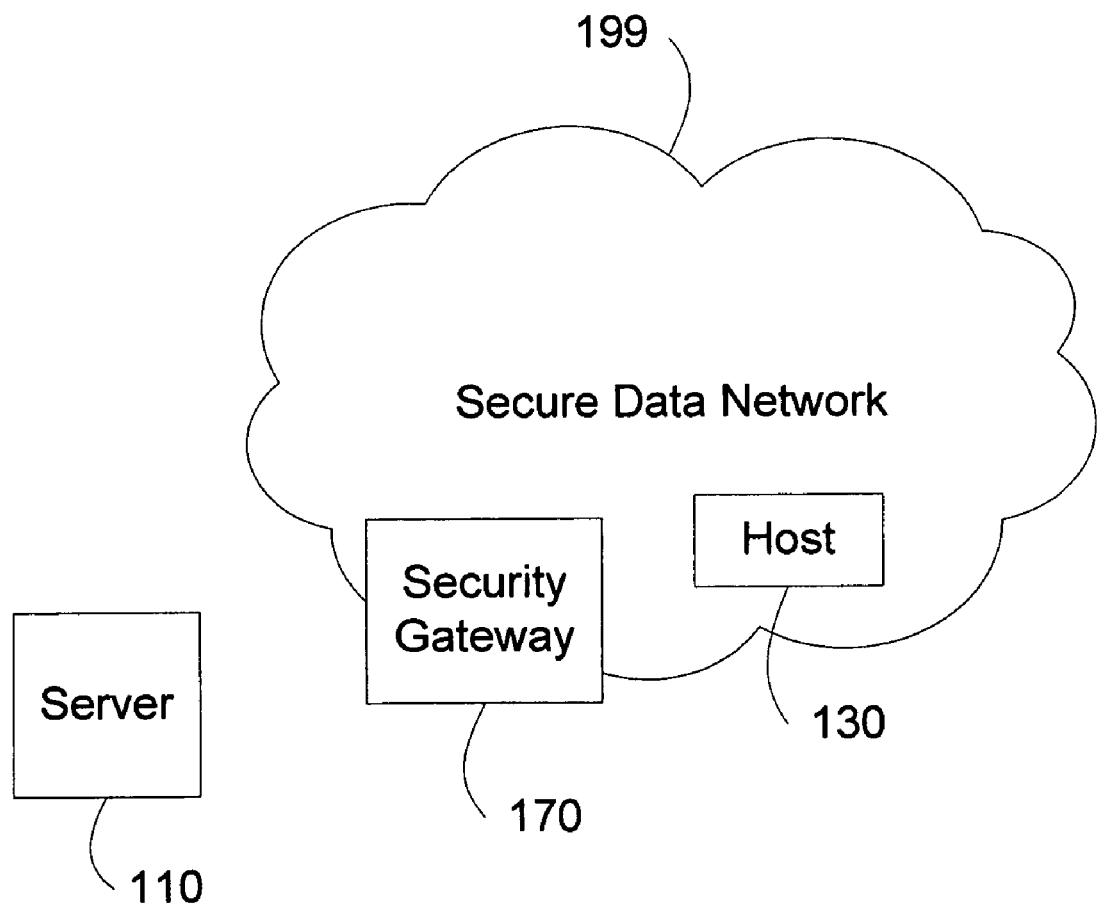
FIG. 1a illustrates a secure data network.

FIG. 1a illustrates a secure data network. Security gateway 170 protects a secure data network 199.

In one embodiment, secure data network 199 is a residential data network. In one embodiment, secure data network 199 is a corporate network. In one embodiment, secure data network 199 is a regional corporate network. In one embodiment, secure data network 199 is a service provider network.

In one embodiment, security gateway 170 is a residential broadband gateway. In one embodiment, security gateway 170 is a corporate firewall. In one embodiment, security gateway 170 is a regional office firewall or a department firewall. In one embodiment, security gateway 170 is a corporate virtual private network (VPN) firewall. In one embodiment, security gateway 170 is an Internet gateway of a service provider network.

When host 130 inside secure data network 199 accesses a server 110 outside secure data network 199, host 130 establishes a session with server 110 through security gateway 170. Data packets exchanged within the session, between host 130 and server 110, pass through security gateway 170. Security gateway 170 applies a plurality of security policies during processing of the data packets within the session. Examples of security policies include network address protection, content filtering, virus detection and infestation prevention, spyware or phishing blocking, network intrusion or denial of service prevention, data traffic monitoring, or data traffic interception.

Figure 1B:
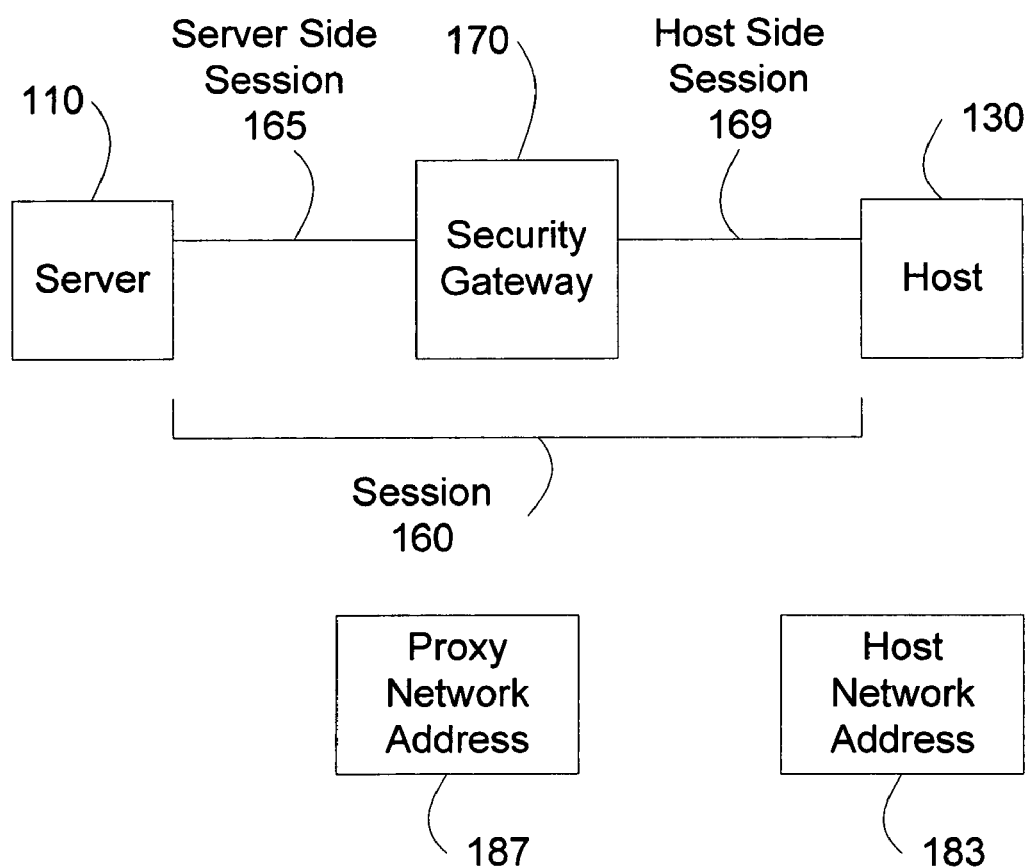
FIG. 1b illustrates an overview of a network address translation (NAT) process.

FIG. 1b illustrates an overview of a network address translation (NAT) process.

In one embodiment, a security policy is to protect network address of host 130. Host 130 uses a host network address 183 in a session 160 between host 130 and server 110. In one embodiment, the host network address 183 includes an IP address of host 130. In another embodiment, the host network address 183 includes a session port address of host 130.

Security gateway 170 protects host 130 by not revealing the host network address 183. When host 130 sends a session request for session 160 to security gateway 170, the session request includes host network address 183.

Security gateway 170 establishes host side session 169 with host 130. Host 130 uses host network address 183 in session 169.

Security gateway 170 selects a proxy network address 187. Security gateway 170 uses proxy network address 187 to establish server side session 165 with server 110.

Server side session 165 is the session between security gateway 170 and server 110. Host side session 169 is the session between security gateway 170 and host 130. Session 160 includes server side session 165 and host side session 169.

Security gateway 170 performs network address translation (NAT) process on session 160. Security gateway 170 performs network address translation process on data packets received on server side session 165 by substituting proxy network address 187 with host network address 183. Security gateway 170 transmits the translated data packets onto host side session 169. Similarly, security gateway 170 performs network address translation process on data packets received on host side session 169 by substituting host network address 183 with proxy network address 187. Security gateway 170 transmits the translated data packets onto server side session 165.

In one embodiment, session 160 is a transmission control protocol (TCP) session. In one embodiment, session 160 is a user datagram protocol (UDP) session. In one embodiment, session 160 is an internet control messaging protocol (ICMP) session. In one embodiment, session 160 is based on a transport session protocol on top of IP protocol. In one embodiment, session 160 is based on an application session protocol on top of IP protocol.

Figure 1C:
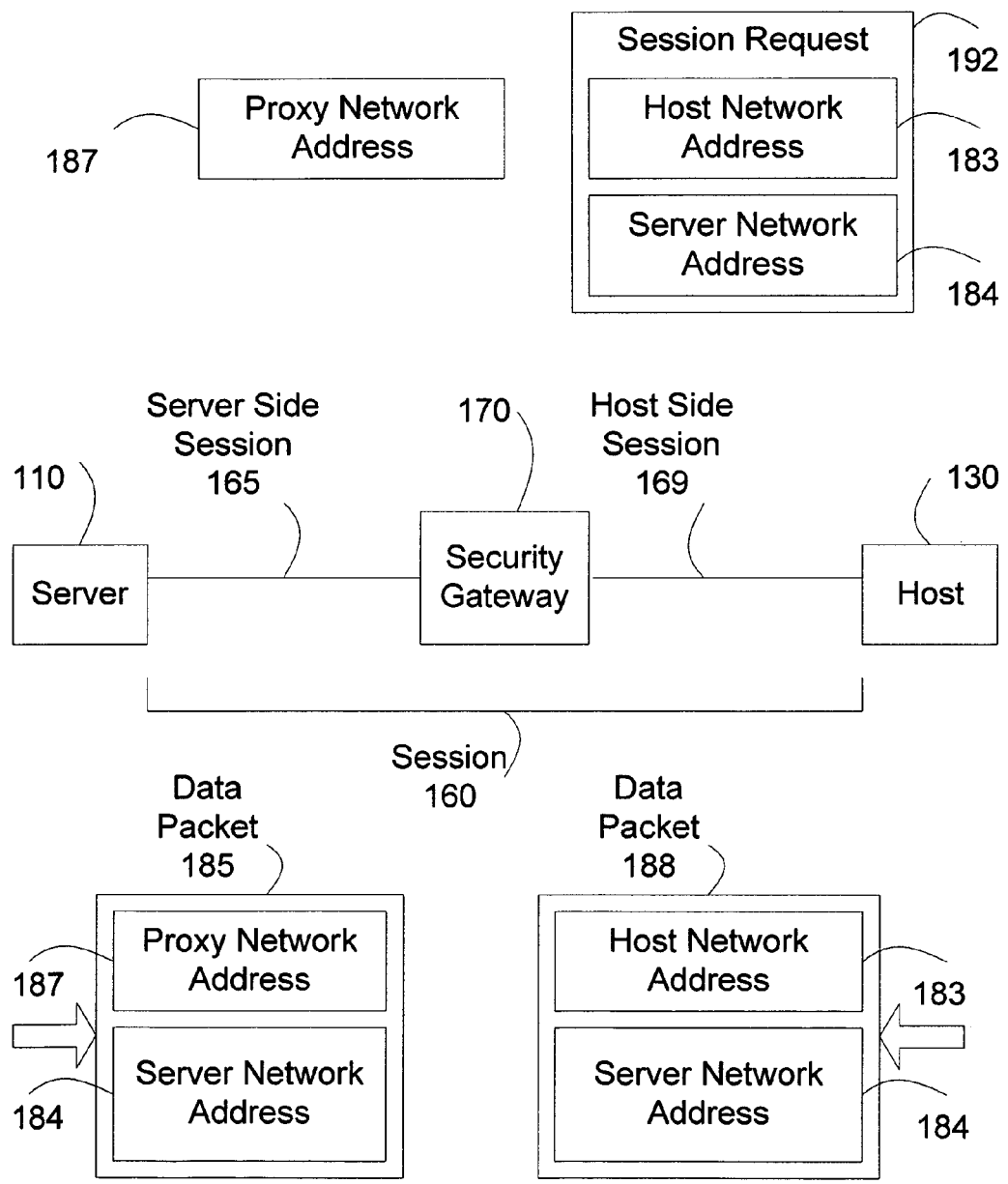
FIG. 1c illustrates a NAT process for a TCP session.

FIG. 1c illustrates a NAT process for a TCP session.

Host 130 sends a session request 192 for establishing a session 160 with server 110. Session 160 is a TCP session. Session request 192 includes host network address 183 and server network address 184. Security gateway 170 receives session request 192. Security gateway 170 extracts host network address 183 from session request 192. Security gateway 170 determines a proxy network address 187. In one embodiment, host network address 183 includes a host's IP address, and security gateway 170 determines a proxy IP address to substitute host's IP address. In one embodiment, host network address 183 includes a host's TCP port number, and security gateway 170 determines a proxy TCP port number to substitute host's TCP port number. Security gateway 170 extracts server network address 184 from session request 192. Security gateway 170 establishes a server side session 165 with server 110 based on server network address 184 and proxy network address 187. Server side session 165 is a TCP session.

Security gateway 170 also establishes a host side session 169 with host 130 by responding to session request 192.

After establishing server side session 165 and host side session 169, security gateway 170 processes data packets from server side session 165 and host side session 169.

In one embodiment, security gateway 170 receives a data packet 185 from server side session 165. Data packet 185 includes server network address 184 and proxy network address 187. Security gateway 170 extracts server network address 184 and proxy network address 187. Security gateway 170 determines host side session 169 based on the extracted network addresses. Security gateway 170 further determines host network address 183 from host side session 169. Security gateway 170 modifies data packet 185 by first substituting proxy network address 187 with host network address 183. Security gateway 170 modifies other parts of data packet 185, such as TCP checksum, IP header checksum. In one embodiment, security gateway 170 modifies payload of data packet 185 by substituting any usage of proxy network address 187 with host network address 183.

After security gateway 170 completes modifying data packet 185, security gateway 170 transmits the modified data packet 185 onto host side session 169.

In a similar fashion, security gateway 170 receives a data packet 188 from host side session 169. Data packet 188 includes server network address 184 and host network address 183. Security gateway 170 extracts server network address 184 and host network address 183. Security gateway 170 determines server side session 165 based on the extracted network addresses. Security gateway 170 further determines proxy network address 187 from server side session 165. Security gateway 170 modifies data packet 188 by first substituting host network address 183 with proxy network address 187. Security gateway 170 modifies other parts of data packet 188, such as TCP checksum, IP header checksum. In one embodiment, security gateway 170 modifies payload of data packet 188 by substituting any usage of host network address 183 with proxy network address 187.

After security gateway 170 completes modifying data packet 188, security gateway 170 transmits the modified data packet 188 onto server side session 165.

Figure 2:
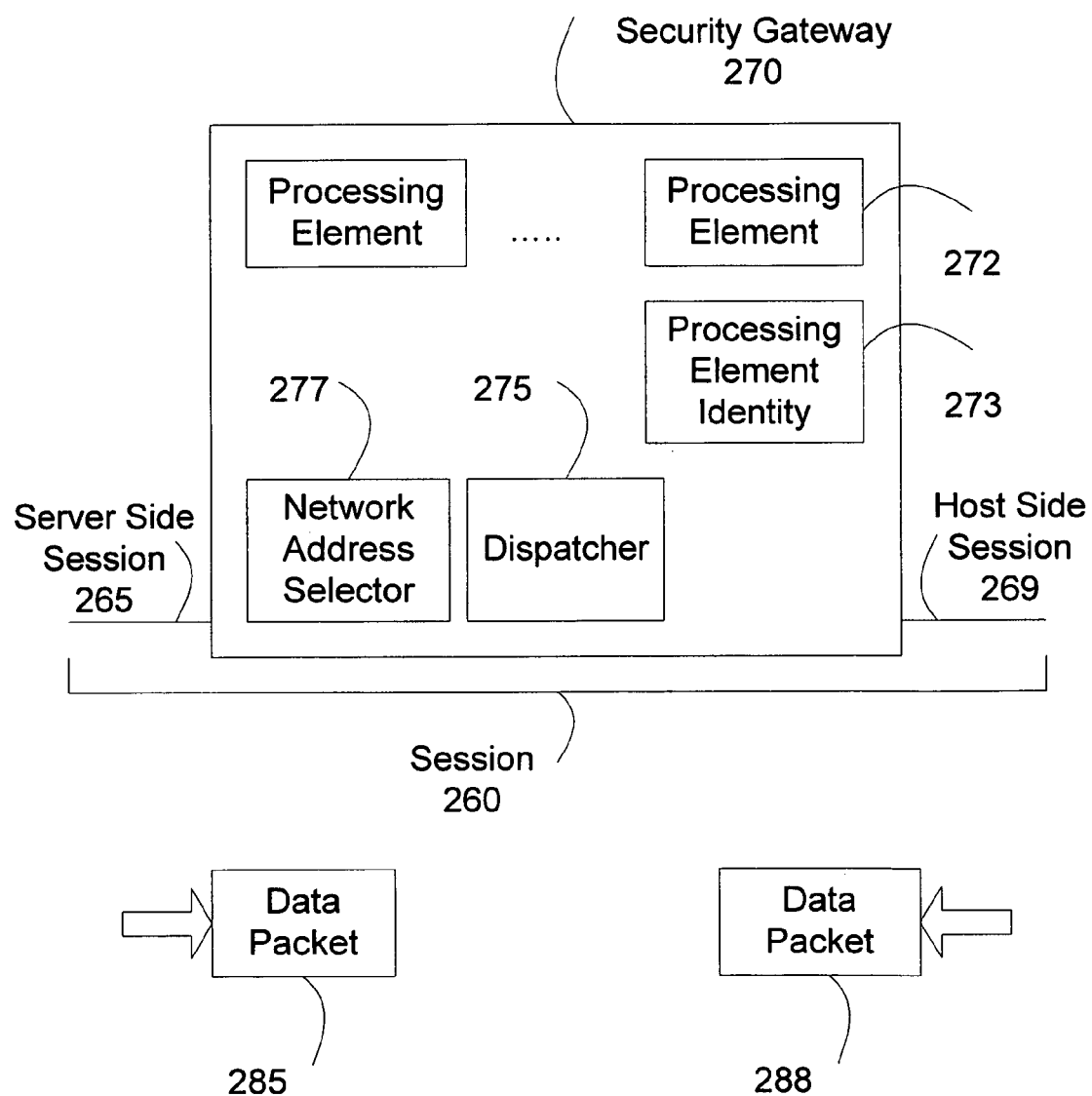
FIG. 2 illustrates a distributed multi-processing security gateway.

FIG. 2 illustrates a distributed multi-processing security gateway.

In one embodiment, security gateway 270 is a distributed multi-processing system. Security gateway 270 includes a plurality of processing elements. A processing element 272 includes a memory module. The memory module stores host network addresses, proxy network addresses and other information for processing element 272 to apply security policies as described in FIG. 1. Processing element 272 has a processing element identity 273.

Security gateway 270 includes a dispatcher 275. Dispatcher 275 receives a data packet and determines a processing element to process the data packet. Dispatcher 275 typically calculates a processing element identity based on the data packet. Based on the calculated processing element identity, security gateway 270 assigns the data packet to the identified processing element for processing.

In one embodiment, dispatcher 275 receives a data packet 288 from host side session 269 and calculates a first processing element identity based on the host network address and server network address in data packet 288. In another embodiment dispatcher 275 receives a data packet 285 from server side session 265 and calculates a second processing element identity based on the proxy network address and server network address in data packet 285.

Security gateway 270 includes a network address selector 277. Network address selector 277 selects a proxy network address based on network information. The network information includes a host network address obtained in a session request for session 260 and a security gateway network address. Other types of network information may also be used. The proxy network address is used to establish server side session 265. The proxy network address is selected such that the first processing element identity and the second processing element identity calculated by dispatcher 275 are the same. In other words, a same processing element is assigned to process data packet 285 from server side session 265 and data packet 288 from host side session 269.

Figure 3:
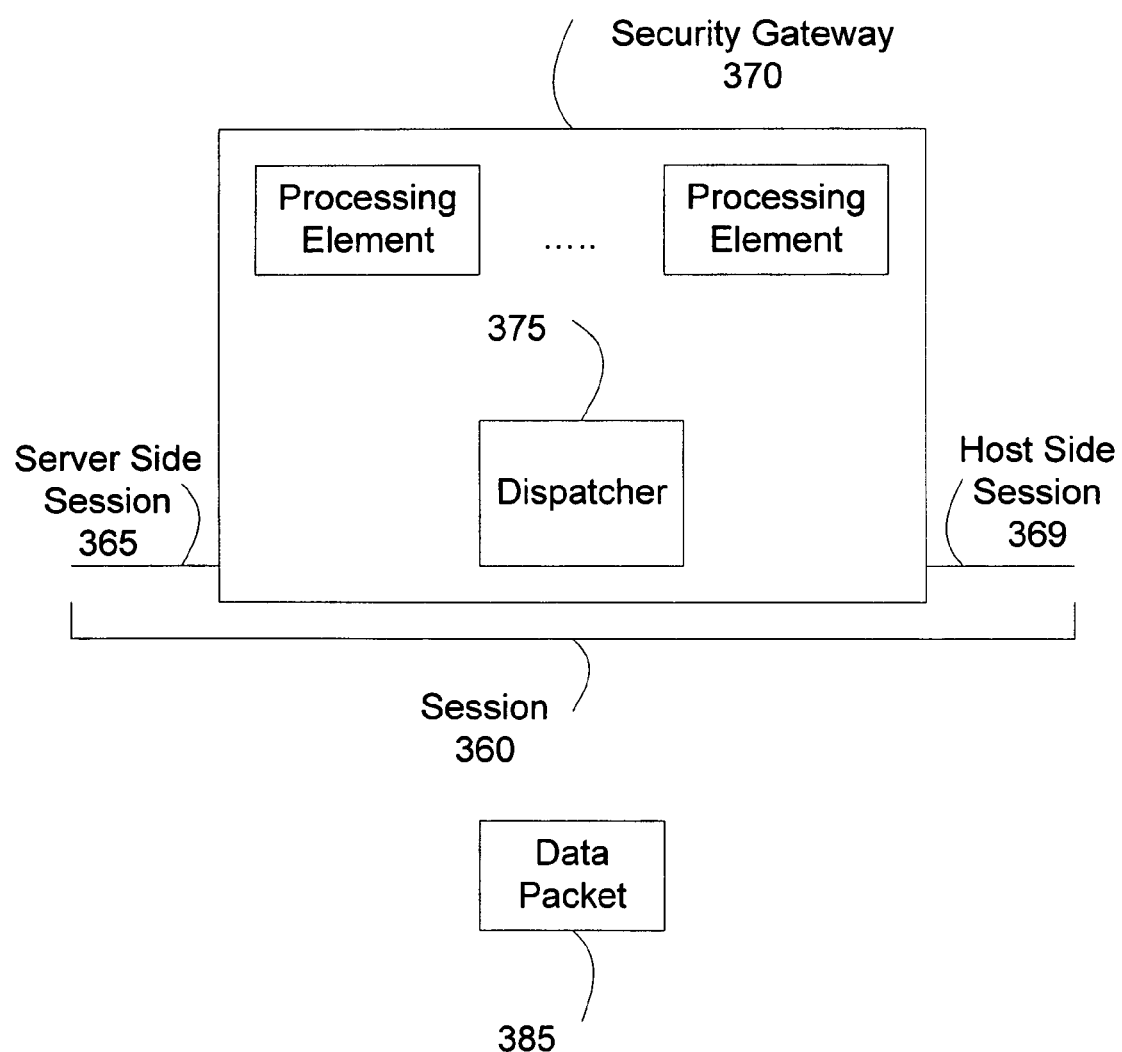
FIG. 3 illustrates a dispatching process.

FIG. 3 illustrates a dispatching process.

Dispatcher 375 calculates a processing element identity based on two network addresses obtained from a data packet 385 of session 360. Session 360 includes host side session 369 and server side session 365. The two network addresses of host side session 369 are server network address and host network address. The two network addresses of server side session 365 are proxy network address and server network address. Dispatcher 375 calculates to the same processing element identity for host side session 369 and server side session 365.

In one embodiment, dispatcher 375 calculates based on a hashing function.

In one embodiment, dispatcher 375 computes a sum by adding the two network addresses. In one example, dispatcher 375 computes a sum by performing a binary operation, such as an exclusive or (XOR) binary operation, or an and (AND) binary operation, onto the two network addresses in binary number representation. In one example, dispatcher 375 computes a sum by first extracting portions of the two network addresses, such as the first 4 bits of a network address, and applies an operation such as a binary operation to the extracted portions. In one example, dispatcher 375 computes a sum by first multiplying the two network addresses by a number, and by applying an operation such as addition to the multiple.

In one embodiment, dispatcher 375 computes a processing element identity by processing on the sum. In one embodiment, there are 4 processing elements in security gateway 370. In one example, dispatcher 375 extracts the first two bits of the sum, and interprets the extracted two bits as a numeric number between 0 and 3. In one example, dispatch 375 extracts the first and last bit of the sum, and interprets the extracted two bits as a numeric number between 0 and 3. In one example, dispatcher 375 divides the sum by 4 and determines the remainder of the division. The remainder is a number between 0 and 3.

In one embodiment, security gateway 370 includes 8 processing elements. Dispatcher 375 extracts 3 bits of the sum and interprets the extracted three bits as a numeric number between 0 and 7. In one example, dispatcher 375 divides the sum by 8 and determines the remainder of the division. The remainder is a number between 0 and 7.

In one embodiment, a network address includes an IP address and a session port address. Dispatcher 375 computes a sum of the IP addresses and the session port addresses of the two network addresses.

Though the teaching is based on the above description of hashing functions, it should be obvious to the skilled in the art to implement a different hashing function for dispatcher 375.

Figure 4:
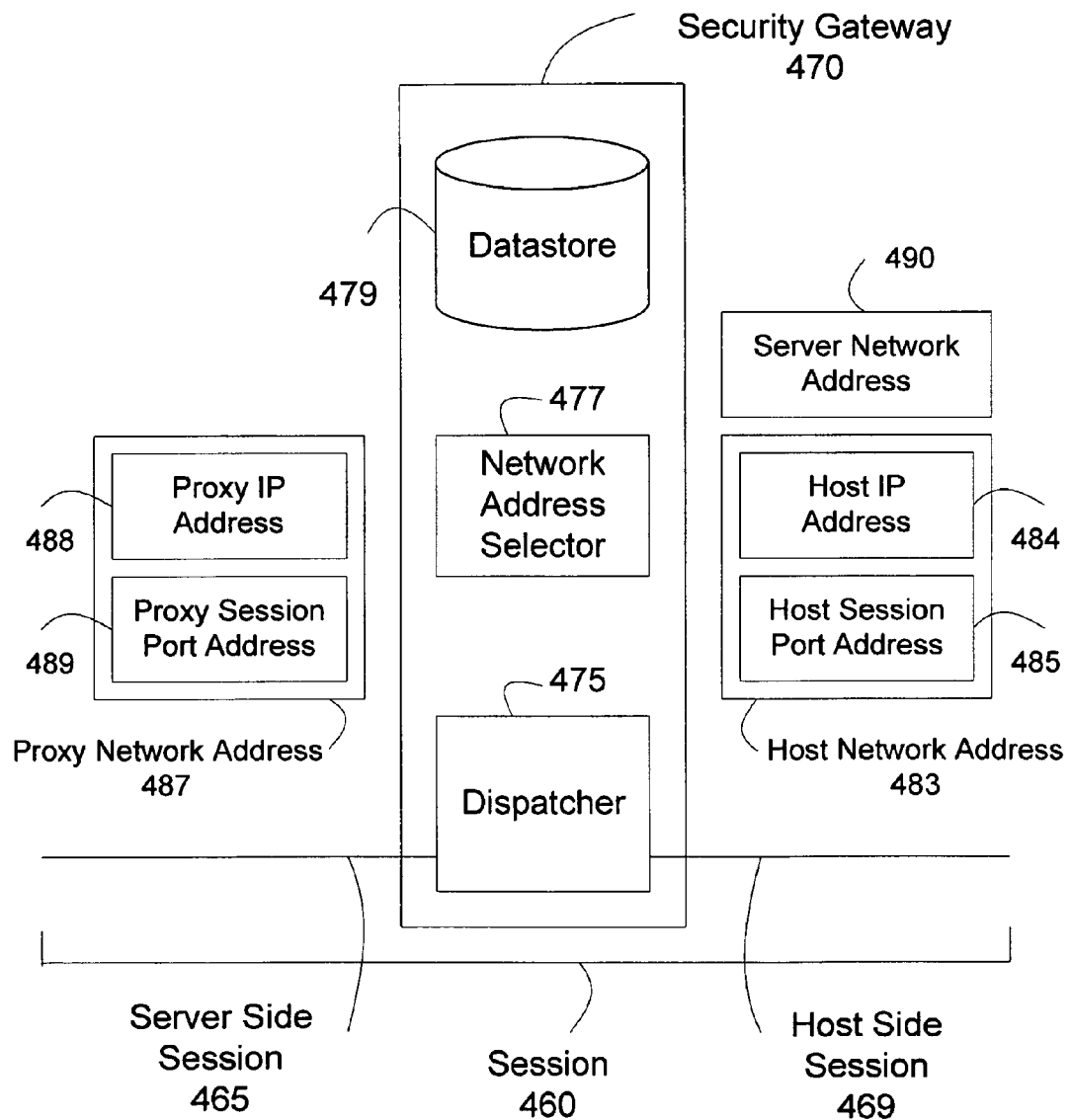
FIG. 4 illustrates a proxy network address selection process.

FIG. 4 illustrates a proxy network address selection process.

Network address selector 477 selects a proxy network address 487 for a host network address 483. In one embodiment, host network address 483 includes a host IP address 484 and a host session port address 485; proxy network address 487 includes a proxy IP address 488 and a proxy session port address 489. Proxy network address 487 is selected such that dispatcher 475 calculates to the same processing element identity on host side session 469 and server side session 465.

In one embodiment, the selection process is based on the dispatching process, illustrated in FIG. 3. In one example, dispatcher 475 uses the method of computing the sum of two IP addresses, and two session port addresses, and then divides the sum by 4. In one embodiment, network address selector 477 first selects proxy IP address 488. Network address selector 477 then selects proxy session port address 489 such that when using the method on server network address 490 and host network address 483 dispatcher 475 calculates the same processing element identity as when using the method on server network address 490 and proxy network address 487.

In one example, dispatcher 475 computes a sum from a binary operator XOR of the two network addresses, and extracts the last 3 digits of the sum. Network address selector 477 selects a proxy session port address 489 that has the same last 3 digits of the host session port address 485.

In one embodiment, security gateway 470 performs network address translation process for a plurality of existing sessions. Network address selector 477 checks if the selected proxy network address 487 is not used in the plurality of existing sessions. In one embodiment, security gateway 470 includes a datastore 479. Datastore 479 stores a plurality of proxy network addresses used in a plurality of existing sessions. Network address selector 477 determines the selected proxy network address 487 is not used by comparing the selected proxy network address 487 against the stored plurality of proxy network addresses and not finding a match.

In one embodiment, a processing element includes network address selector. A processing element receives a data packet assigned by security gateway based on a processing element identity calculated by dispatcher. In one embodiment, the processing element determines that the data packet includes a session request. The network address selector in the processing element selects a proxy network address based on the host network address in the session request as illustrated in FIG. 4.

In one embodiment, a particular first processing element includes network address selector. A second processing element without network address selector receives a data packet and determines that the data packet includes a session request. The second processing element sends the data packet to the first processing element using, for example, a remote function call. The first processing element receives the data packet. The network address selector selects a proxy network address based on the host network address in the session request.

In one embodiment, datastore is implemented in the memory module of a processing element. In one embodiment, the plurality of proxy network addresses in datastore are stored in each of the memory modules of each of the processing elements. In one embodiment, the plurality of proxy network addresses in datastore are stored in the memory modules in a distributive manner, with the proxy network addresses used in the sessions processed by a processing element stored in the memory module of the processing element.

In one embodiment, security gateway includes a memory shared by the plurality of process elements. Security gateway partitions the shared memory into memory regions. A process element has access to a dedicated memory region, and does not have access to other memory regions.

In one embodiment, security gateway includes a central processing unit. In one embodiment, the central process unit includes a plurality of processing threads such as hyper-thread, micro-engine or other processing threads implemented in circuitry such as application specific integrated circuit (ASIC) or field programmable gate array (FPGA). A processing element is a processing thread.

In one embodiment, a central processing unit includes a plurality of micro-processor cores. A processing thread is a micro-processor core.

In one embodiment, a security policy is for virus detection or blocking. In one embodiment, a security policy is for phishing detection or blocking. In one embodiment, a security policy is for traffic quota enforcement. In one embodiment, a security policy is for lawful data interception.

In one embodiment, the NAT process is for a UDP session. In one embodiment, security gateway receives a UDP packet. In one embodiment, security gateway determines that the UDP packet is not from an existing session. Security gateway processes the UDP packet as a session request.

In one embodiment, the NAT process is for an ICMP session. In a similar fashion, security gateway processes an ICMP packet from a non-existing session as a session request.

We claim:

1. A method for providing a security gateway, comprising:
   (a) receiving by the security gateway a session request for a session between a host and a server;
   (b) establishing by the security gateway a host side session between the security gateway and the host, the security gateway comprising a central processing unit, the central processing unit comprising a plurality of microprocessors;
   (c) computing by the security gateway a sum of network addresses for the host side session;
   (d) selecting by the security gateway a proxy network address for the host based on the sum to result in a calculated first microprocessor identity of a first microprocessor of the plurality of microprocessors being the same as a calculated second microprocessor identity of a second microprocessor of the plurality of microprocessors;
- (e) establishing by the security gateway a server side session between the security gateway and the server using the proxy network address;
- (f) in response to receiving a first data packet from the host side session, calculating by the security gateway the first microprocessor identity, comprising:
  - (f1) applying a hash function to a host network address for the host and a server network address for the server to obtain a first result,
  - (f2) extracting a plurality of bits from the first result,
  - (f3) interpreting the extracted bits from the first result as a number for the first microprocessor identity,
  - (f4) assigning the first microprocessor with the first microprocessor identity to process data packets received from the host side session according to security policies,
  - (f5) substituting by the security gateway the host network address in the processed data packets received from the host side session with the proxy network address, and
  - (f6) sending by the security gateway the processed data packets received from the host side session to the server side session; and
- (g) in response to receiving a second data packet from the server side session, calculating by the security gateway the second microprocessor identity, comprising:
  - (g1) applying the hash function to the proxy network address and the server network address to obtain a second result,
  - (g2) extracting a plurality of bits from the second result,
  - (g3) interpreting the extracted bits from the second result as a number for the second microprocessor identity, and
  - (g4) assigning the second microprocessor with the second microprocessor identity to process data packets received from the server side session according to the security policies.

2. The method of claim 1, wherein the computing (c) comprises:
- (c1) computing by the security gateway a key based on a security gateway network address for the security gateway and the host network address.

3. The method of claim 1, wherein the calculating (g) further comprises:
- (g5) substituting by the security gateway the proxy network address in the processed data packets received from the server side session with the host network address; and
- (g6) sending by the security gateway the processed data packets received from the server side session to the host side session.

4. The method of claim 1, wherein the selecting (d) further comprises:
- (d1) determining by the security gateway that the proxy network address is not used in an existing session by comparing the proxy network address against addresses in a datastore.

5. The method of claim 1, wherein the central processing unit comprises a plurality of processing threads implemented in circuitry,
  wherein the selecting (d) comprises:
    selecting by the security gateway the proxy network address for the host based on the sum to result in a calculated first processing thread identity of a first processing thread of the plurality of processing threads being the same as a calculated second processing thread identity of a second processing thread of the plurality of processing threads,
  wherein the calculating (f) comprises:
    applying the hash function to the host network address and the server network address to obtain the first result,
    extracting the plurality of bits from the first result,
    interpreting the extracted bits from the first result as a number for the first processing thread identity, and
    assigning the first processing thread with the first processing thread identity to process the data packets received from the host side session according to the security policies;
  wherein the calculating (g) comprises:
    applying the hash function to the proxy network address and the server network address to obtain the second result,
    extracting the plurality of bits from the second result,
    interpreting the extracted bits from the second result as a number for the second processing thread identity, and
    assigning the second processing thread with the second processing thread identity to process the data packets received from the server side session according to the security policies.

6. The method of claim 1, wherein the central processing unit comprises a plurality of microprocessing cores,
  wherein the selecting (d) comprises:
    selecting by the security gateway the proxy network address for the host based on the sum to result in a calculated first microprocessing core identity of a first microprocessing core of the plurality of microprocessing cores being the same as a calculated second microprocessing core identity of a second microprocessing core of the plurality of microprocessing cores,
  wherein the calculating (f) comprises:
    applying the hash function to the host network address and the server network address to obtain the first result,
    extracting the plurality of bits from the first result,
    interpreting the extracted bits from the first results as a number for the first microprocessing core identity, and
    assigning the first microprocessing core with the first microprocessing core identity to process the data packets received from the host side session according to the security policies; and
  wherein the calculating (g) comprises:
    applying the hash function to the proxy network address and the server network address to obtain the second result,
    extracting the plurality of bits from the second result,
    interpreting the extracted bits from the second result as a number for the second microprocessing core, and
    assigning the second microprocessing core with the second microprocessing core identity to process the data packets received from the server side session according to the security policies.

7. A computer program product comprising a computer useable non-transitory storage medium having a computer readable program, wherein the computer readable program when executed on a computer causes the computer to:
- (a) receive a session request for a session between a host and a server;
- (b) establish a host side session between a security gateway and the host, the security gateway comprising a central processing unit, the central processing unit comprising a plurality of microprocessors;
(c) compute a sum of network addresses for the host side session;
(d) select a proxy network address for the host based on the sum to result in a calculated first microprocessor identity of a first microprocessor of the plurality of microprocessors being the same as a calculated second microprocessor identity of a second microprocessor of the plurality of microprocessors;
(e) establish a server side session between the security gateway and the server using the proxy network address;
(f) in response to receiving a first data packet form the host side session, calculate the first microprocessor identity, comprising:
(f1) apply a hash function to a host network address for the host and a server network address for the server to obtain a first result,
(f2) extract a plurality of bits from the first result,
(f3) interpret the extracted bits from the first result as a number for the first microprocessor identity,
(f4) assign the first microprocessor with the first microprocessor identity to process data packets received from the host side session according to security policies,
(f5) substitute the host network address in the processed data packets received from the host side session with the proxy network address, and
(f6) send the processed data packets received from the host side session to the server side session; and
(g) in response to receiving a second data packet from the server side session, calculate the second microprocessor identity, comprising:
(g1) apply the hash function to the proxy network address and the server network address to obtain a second result,
(g2) extract a plurality of bits from the second result,
(g3) interpret the extracted bits from the second result as a number for the second microprocessor identity, and
(g4) assign the second microprocessor with the second microprocessor identity to process data packets received from the server side session according to the security policies.

8. The computer program product of claim 7, wherein the compute (c) comprises:
(c1) compute a key based on a security gateway network address for the security gateway and the host network address.

9. The computer program product of claim 7, wherein the calculate (g) further comprises:
(g5) substitute the proxy network address in the processed data packets received from the server side session with the host network address; and
(g6) send the processed data packets received from the server side session to the host side session.

10. The computer program product of claim 7, wherein the select (d) further comprises:
(d1) determine the proxy network address is not used in an existing session by comparing the proxy network address against addresses in a datastore.

11. The computer program product of claim 7, wherein the central processing unit comprises a plurality of processing threads implemented in circuitry,
wherein the select (d) comprises:
select the proxy network address for the host based on the sum to result in a calculated first processing thread identity of a first processing thread of the plurality of processing threads being the same as a calculated second processing thread identity of a second processing thread of the plurality of processing threads,
wherein the calculate (f) comprises:
apply the hash function to the host network address and the server network address to obtain the first result,
extract the plurality of bits from the first result,
interpret the extracted bits from the first result as a number for the first processing thread identity, and
assign the first processing thread with the first processing thread identity to process the data packets received from the host side session according to the security policies; and
wherein the calculate (g) comprises:
apply the hash function to the proxy network address and the server network address to obtain the second result,
extract the plurality of bits from the second result,
interpret the extracted bits from the second result as a number for the second processing thread identity, and
assign the second processing thread with the second processing thread identity to process the data packets received from the server side session according to the security policies.

12. The computer program product of claim 7, wherein the central processing unit comprises a plurality of microprocessing cores,
wherein the select (d) comprises:
select the proxy network address for the host based on the sum to result in a calculated first microprocessing core identity of a first microprocessing core of the plurality of microprocessing cores being the same as a calculated second microprocessing core identity of a second microprocessing core of the plurality of microprocessing cores,
wherein the calculate (f) comprises:
apply the hash function to the host network address and the server network address to obtain a first result,
extract the plurality of bits from the first result,
interpret the extracted bits from the first results as a number for the first microprocessing core identity, and
assign the first microprocessing core with the first microprocessing core identity to process the data packets received from the host side session according to the security policies; and
wherein the calculate (g) comprises:
apply the hash function to the proxy network address and the server network address to obtain the second result,
extract the plurality of bits from the second result,
interpret the extracted bits from the second result as a number for the second microprocessing core, and
assign the second microprocessing core with the second microprocessing core identity to process the data packets received from the server side session according to the security policies.

13. The method of claim 1, wherein the plurality of microprocessors consists of N number of microprocessors and the plurality of bits consists of M number of bits, wherein N is no more than $2^M$.

14. The computer program product of claim 7, wherein the plurality of microprocessors consists of N number of microprocessors and the plurality of bits consists of M number of bits, wherein N is no more than $2^M$.

15. A method for providing a security gateway, comprising:
(a) receiving by the security gateway a session request for a session between a host and a server;

(b) establishing by the security gateway a host side session between the security gateway and the host, the security gateway comprising a central processing unit, the central processing unit comprising a plurality of microprocessors;

(c) computing by the security gateway a sum of network addresses for the host side session;

(d) selecting by the security gateway a proxy network address for the host based on the sum to result in a calculated first microprocessor identity of a first microprocessor of the plurality of microprocessors being the same as a calculated second microprocessor identity of a second microprocessor of the plurality of microprocessors;

(e) establishing by the security gateway a server side session between the security gateway and the server using the proxy network address;

(f) in response to receiving a first data packet from the host side session, calculating by the security gateway the first microprocessor identity, assigning the first microprocessor with the first microprocessor identity to process data packets received from the host side session according to security policies, substituting by the security gateway a host network address in the processed data packets received from the host side session with the proxy network address, and sending by the security gateway the processed data packets received from the host side session to the server side session; and (g) in response to receiving a second data packet from the server side session, calculating by the security gateway the second microprocessor identity and assigning the second microprocessor with the second microprocessor identity to process data packets received from the server side session according to the security policies.

* * * * *